Patented May 1, 1928.

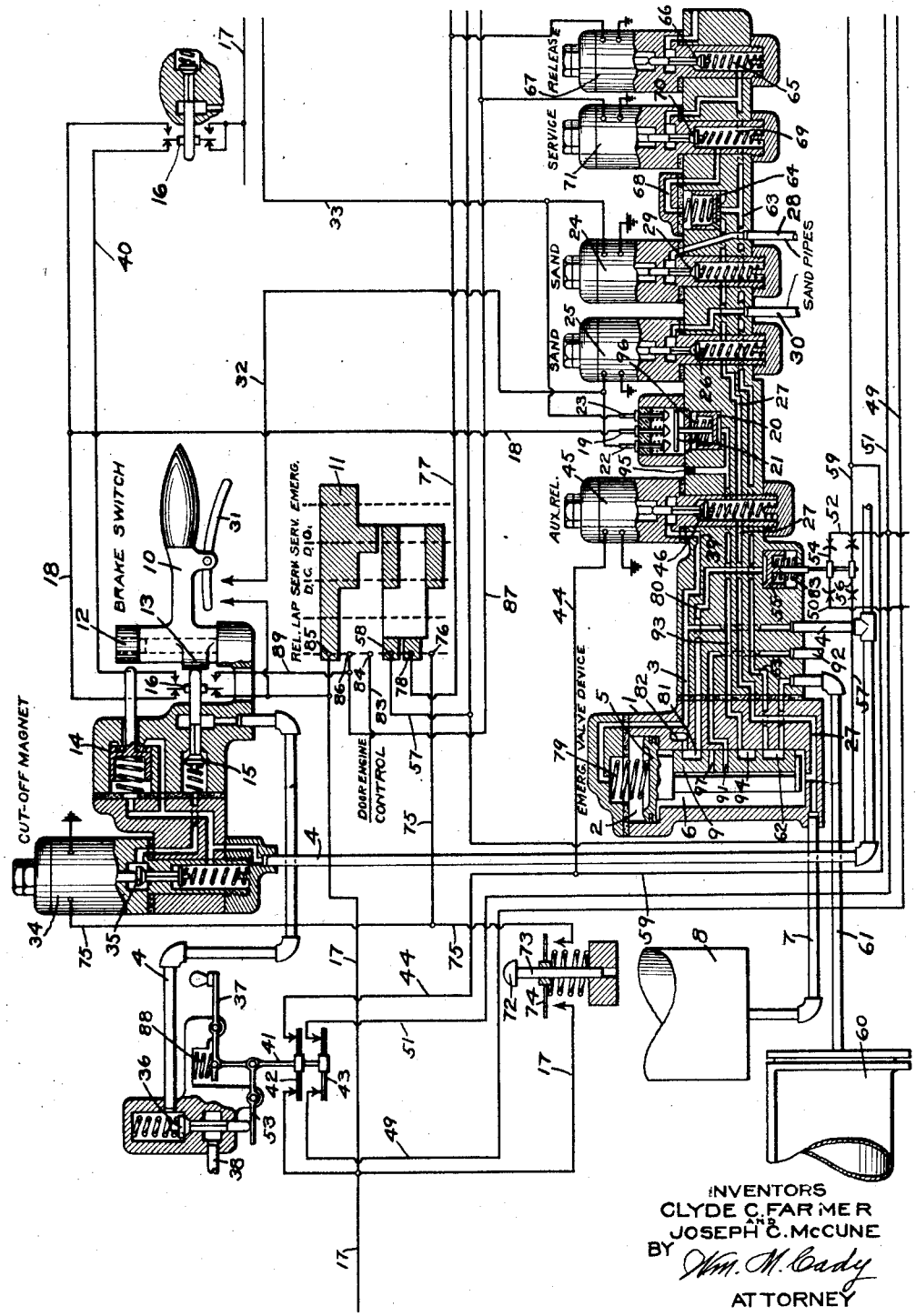

1,668,008

UNITED STATES PATENT OFFICE.

CLYDE C. FARMER, OF PITTSBURGH, AND JOSEPH C. McCUNE, OF EDGEWOOD, PENN-SYLVANIA, ASSIGNORS TO THE WESTINGHOUSE AIR BRAKE COMPANY, OF WIL-MERDING, PENNSYLVANIA, A CORPORATION OF PENNSYLVANIA.

ELECTROPNEUMATIC SAFETY BRAKE.

Application filed May 21, 1926. Serial No. 110,610.

This invention relates to safety brake and car control apparatus by which the car may be safely controlled, in case the operator should become disabled.

The principal object of our invention is to provide a simplified safety control apparatus in which the piping is reduced by employing electrically controlled pneumatic devices.

In the accompanying drawing, the single figure is a diagrammatic view, principally in section, of a safety brake apparatus embodying our invention.

As shown in the drawing, the safety car control equipment may consist of an emergency valve device comprising a casing 1 having a piston chamber 2 connected through passage 3 with a control pipe 4 and containing piston 5 and a valve chamber 6 connected by pipe 7 to main reservoir 8 and containing a slide valve 9 adapted to be operated by piston 5.

At each end of the car, a brake and door controlling switch device is provided comprising an operating handle 10 and a contact drum 11 (shown diagrammatically with developed contact faces) adapted to be operated by said handle. Cams 12 and 13 are associated with said handle and cam 12 is adapted in emergency position of handle 10 to lift a valve piston 14 from its seat. The cam 13 is adapted to hold a valve 15 from its seat in all positions of the handle and said valve is permitted to seat, only when the handle is removed from the brake switch. When the handle 10 is in place and the valve 15 is held open, a contact member 16, movable with said valve, closes a circuit from a source of current supply wire 17 to a wire 18 which leads to a contact 19 associated with an emergency sanding control switch device.

Said switch device comprises a piston 20 and a contact member 21 operable by said piston for closing a circuit from contact 19 to contacts 22 and 23, connected respectively to sand control magnets 24 and 25 for controlling the sanding of the rails at opposite ends of the car. Magnet 25 operates a valve 26, the opening of which permits the supply of fluid under pressure from passage 27 and the main reservoir to a passage 30 leading to the rail sanding device at one end of the car. Magnet 24 operates a valve 29, the opening of which permits the supply of fluid from passage 27 to passage 28, leading to the rail sanding device at the opposite end of the car.

Handle 10 is provided with a pivoted switch lever 31 which may be operated by the motorman to close a circuit from the current supply wire 17 to a wire 32 connected to the magnet 25 at one end of the car or to close a similar circuit to wire 33 leading to magnet 24 when the handle 10 is associated with the brake switch at the opposite end of the car.

Associated with the brake switch controlling device is a cut-off magnet device comprising a magnet 34 and a valve 35 adapted to be controlled by said magnet and operating to control communication through the control pipe 4 to a pilot valve 36 which is associated with a dead man's safety control handle 37. Said valve controls communication from pipe 4 to an atmospheric exhaust pipe.

The handle 37 is operatively connected to a stem 41 which carries contact members 42 and 43, the contact member 42 being adapted to close a circuit from the current supply wire 17 to a wire 44 which is connected to an auxiliary release magnet 45. Magnet 45 is adapted to operate a valve 46 which controls communication from passage 27 and the main reservoir 8 to control pipe passage 3.

The contact member 43 is adapted to close a circuit from wire 49, to a wire 51, the wire 49 being connected to a current supply wire 50 and the wire 51 to a wire 52 which leads to a holding coil. The stem 41 is also adapted, through a pivoted lever 53, to control the operation of valve 36.

A switch member 54 also controls the closing of the circuit from wire 50 to wire 52 and member 54 is adapted to be operated by a piston 55. A contact member 56 is also operated by piston 55 and is adapted to close a circuit from a wire 57, connected to a contact 58 in the switch drum 11, to a wire 59 which is connected to the auxiliary release magnet wire 44.

Brake cylinder 60 is connected to a pipe 61, which in the normal release position of emergency slide valve 9, is connected through cavity 62 with a passage 63, which leads to the seat of a relay application valve 64 and also to a valve chamber 65 containing a release valve 66. The valve 66 is controlled by a release magnet 67. One side of the relay valve 64 is connected by a passage 68 to a valve chamber 69 containing a valve 70 adapted to be controlled by a service application magnet 71.

A foot operable switch device is provided comprising a push button 72 having a stem 73 carrying a switch member 74. When the switch member 74 is moved, it operates to close a circuit from current supply wire 17 to a wire 75 which is connected to the cut-off magnet 34. The wire 75 is also connected to a contact 76 in the switch drum 11.

In operation, when the brake switch operating handle is applied at one end of the car, the cam 13 operates to open the valve 15 and thereby establishes communication through the control pipe 4 to the pilot valve 36, provided the foot button 72 is not depressed, so as to energize the cut-off magnet 34.

With the handle in release position, a circuit is closed through contact 78 to wire 77 which leads to release magnet 67, so that the release magnet 67 is energized to hold the release valve 66 open.

If the safety controller handle 37 is depressed by the motorman, the valve 36 is permitted to seat and cut-off communication from the control pipe 4 to the exhaust pipe 38 and the stem 41 is also moved so that contact members 42 and 43 close their respective circuits.

Contact member 42 then connects current supply wire 17 with wire 44, so that the auxiliary release magnet 45 is energized and the valve 46 is thereby held unseated. Fluid under pressure from the main reservoir 8 is then supplied to the control pipe 4 and also to piston chamber 2 of the emergency valve device. Valve chamber 6 being connected to the main reservoir, the fluid pressures on opposite sides of piston 5 are balanced, permitting the spring 79 to maintain piston 5 and slide valve 9 in release position. In this position, the fluid pressure side of switch piston 55 is connected to the atmosphere through passage 80, cavity 81 in slide valve 9 and exhaust port 82, permitting spring 83 to hold said piston in position, so that switch members 54 and 56 are in circuit closing positions.

In order to effect a service application of the brakes, the motorman moves the brake switch handle either to service, doors closed; or service, doors open, position. A wire 83 connected to contact 84 in the switch drum, leads to electrically controlled mechanism through which the car doors are controlled, and when no current is supplied to wire 83, the door control mechanism is adapted to hold the doors closed. When current is supplied to wire 83, the doors are opened.

In either service position, current is supplied through contact 86 to wire 87, so that current is supplied to the service application magnet 71. In service position, the release magnet 67 is deenergized, so that valve 66 is permitted to seat. The energization of magnet 71 operates to open the valve 70 and fluid under pressure is then vented from the top of the relay valve 64 to the brake cylinder passage 63. The valve 64 thereupon moves upwardly and the main reservoir supply passage 27 is then connected to the brake cylinder passage 63, so that fluid under pressure is supplied to the brake cylinder 60 to effect an application of the brakes.

If, while the car is running along the road, the motorman should remove his hand from the controller handle 37, the spring 88 will shift the stem 41 downwardly, causing the lever 53 to open the valve 36. Fluid from the control pipe 4 is then vented to the exhaust pipe 38, and consequently from the piston chamber 2 of the emergency valve device 1. The downward movement of stem 41 also causes movement of the switch members 42 and 43, so that the circuit to the auxiliary release magnet 45 is opened, deenergizing said magnet. The valve 46 is thus permitted to close, so as to prevent supply of fluid to the control pipe passage 3. Piston 5 of the emergency valve device is shifted to emergency position by the reduction in control pipe pressure, in which position slide valve 6 uncovers a passage leading to the brake cylinder pipe 61, and then fluid under pressure is supplied from valve chamber 6 and the main reservoir 8 to the brake cylinder 60 to effect an emergency application of the brakes.

In release position, a port 91 in the slide valve 9 supplies fluid under pressure to a pipe 92, which pipe constitutes the supply pipe for the door engines. In emergency position, the supply pipe 92 is connected through cavity 94 to passage 93 leading to the sand switch piston 20, so that said piston is operated by fluid under pressure in the door engine supply pipe 92 to effect the closure of the switch member 21. The switch member then closes a circuit to the sand magnets 24 and 25, so that the valves 29 and 26 are operated to supply fluid under pressure to the rail sanding devices.

The fluid pressure in the supply pipe 92 slowly bleeds down through a restricted atmospheric port 95, and the door engines, not being subject to fluid pressure, are balanced, permitting the doors to be manually operated, as desired.

When the fluid pressure has been exhausted through the port 95, the piston 20 is returned to its normal position by spring 96, so that the current supply is cut off from the sand magnets 24 and 25. The valves 29 and 26 are therefore seated and further sanding of the rails and waste of sand is prevented.

In emergency position, a port 97 in slide valve 9, registers with passage 80, so that fluid under pressure is supplied to piston 55. Said piston is thus actuated to move the switch members 54 and 56 to open position.

An emergency application may also be effected by moving the brake switch handle to emergency position. In this position, the cam 12 operates to unseat the valve piston 14, so that fluid under pressure is vented from the control pipe 4 and consequently the emergency valve device 1 is operated as in the case of the release of the controller handle 37, as previously described. The movement of piston 55 operates the switch member 54 so as to open the circuit to the holding coil and thereby, the holding coil being deenergized, the power circuit is opened. The opening of the power circuit may be prevented, if desired, by the operator holding the handle 37 depressed, in which case, the circuit to the holding coil is maintained through the switch member 43.

The movement of the emergency valve parts to emergency position having operated to shift piston 55 and the switch members 54 and 56, the circuit of the auxiliary release magnet 45 from the brake switch is opened by the movement of switch member 56 and consequently in order to release the brakes, in addition to moving the brake switch handle 10 to release position, the controller handle 37 must be depressed, so as to close the circuit of the auxiliary release magnet 45 through the contact member 42. The magnet 45 being thus energized, the valve 46 is shifted to its open position, and fluid under pressure is then supplied from the main reservoir to the control pipe passage 3 and to the piston chamber 2, thus equalizing the fluid pressures on opposite sides of said piston and permitting the spring 79 to move the piston back to release position.

When a service application of the brakes is made, the movement of the brake switch handle 10 to service position, connects contact 76 to the current supply, so that the magnet 34 is maintained energized through wire 75, and this permits the release of the controller handle 37 without causing the magnet 34 to be deenergized, and consequently the pilot valve 36 is held closed. It will thus be seen that when a service application is made, the controller handle 37 may be released without causing an emergency application of the brakes.

In service position of the brake switch 11, the auxiliary release magnet 45 is energized, since current is supplied through contact 58 in this position, to wire 57, which is connected to wire 59, leading through wire 44 to the magnet 45. It will thus be seen that although the circuit of the auxiliary release magnet is broken at the switch member 42 when the controller handle 37 is released, the current supply to said magnet will still be maintained as above described and consequently, the fluid pressure on piston 5 will be maintained and movement of said piston to the emergency position through possible leakage will be prevented.

If the operator wishes to release the controller handle without causing an emergency application of the brakes and without moving the brake switch handle to effect a service application of the brakes, so that he can use his hands for making change or for other purposes, he may do so, by depressing the foot switch button 72. The circuit to the magnet 34 is then closed, energizing said magnet, so that the valve 35 is moved to its seat. Communication through the control pipe 4 to the pilot valve 36 is thus cut off, so that the removal of the hand from the controller handle 37 and the consequent unseating of valve 36 will not be effective to vent fluid from the control pipe.

With the brake switch 11 in release position, the auxiliary release magnet 45 is maintained energized through the contact 58 and wire 57, so that with the foot switch button 72 depressed and the controller handle released, the magnet 45 will not be deenergized by the opening of the magnet circuit at the switch member 42, and consequently the control pipe 4 will continue to be charged from the main reservoir past the valve 46.

When an emergency application is effected by the movement of the brake switch to emergency position and with the controller handle held depressed, the circuit of the release magnet 45 will be held closed, since the switch member 42 is maintained in its closed position, and consequently fluid under pressure will be supplied in such an emergency, past the valve 46 to the control pipe, but a restriction is provided in the passage 3, so that the flow of fluid is not sufficient to prevent the operation of the emergency valve device 1 by the reduction in control pipe pressure as produced by the opening of the valve 14.

At one end of the car, when the handle 10 is removed, the valve stem of valve 15 moves the contact member 16, so as to close a circuit from wire 40 to current supply wire 17, as shown at the right hand side of the drawing. At the other end of the car, a wire 89, leading to the service application wire 87 is adapted to be connected to the wire 40 when the handle 10 is removed from that end and the valve stem of the valve 15 is moved outwardly.

As a result, the service magnet 71 is energized when the handle 10 is not in position at either end of the car and a service application of the brakes is thus effected, when he motorman changes ends.

When the handle 10 is removed, the circuit to the sand control switch device through wire 18 is opened, so that if the parts are in emergency position when the handle is removed, with the sand switch 21 in closed position, for sanding the rails, the removal of the handle 10 will cause the magnets 24 and 25 to be deenergized, and consequently further unnecessary sanding of the rails and waste of sand will be prevented.

The removal of the handle 10 also permits the valve 15 to close, so as to prevent a reduction in control pipe pressure and a consequent emergency application of the brakes, due to the release of the controller handle 37.

In lap position of the brake switch 11, the controller handle 37 must be held depressed, or an emergency application of the brakes will be effected, since in lap position, the circuit to the cut-off magnet 34 is open.

Having now described our invention, what we claim as new and desire to secure by Letters Patent, is:—

1. In a safety brake apparatus, the combination with a control pipe, means operated upon a reduction in pressure in said pipe for effecting an application of the brakes, a handle, and means operated upon release of said handle for venting fluid from said pipe, of electrically controlled means for controlling communication through said control pipe to said handle controlled means, and a foot controlled switch device for controlling the circuit of said electrically controlled means.

2. In a safety brake apparatus, the combination with a control pipe, an emergency valve device operated upon a reduction in fluid pressure in said pipe for effecting an application of the brakes, a handle, and a valve operated upon release of said handle for venting fluid from said pipe, of a valve for controlling communication from said control pipe to said handle controlled valve, a magnet for operating said valve, and a foot controlled switch operated by the foot of the operator for closing the circuit to energize said magnet.

3. In a safety brake apparatus, the combination with a control pipe, means operated upon a reduction in fluid pressure in said pipe for effecting an emergency application of the brakes, a handle, and means operated upon release of said handle for venting fluid from said pipe, of a handle, means operated upon movement of said handle to service position for effecting a service application of the brakes and for cutting off communication through said control pipe to said handle operated pipe venting means.

4. In a safety brake apparatus, the combination with a control pipe, means operated upon a reduction in fluid pressure in said pipe for effecting an emergency application of the brakes, a handle, and means operated upon release of said handle for venting fluid from said pipe, of an electrically controlled valve for controlling communication through said control pipe to said handle operated pipe venting means, a handle, and means operated by said handle for effecting a service application of the brakes and for controlling the circuit of said electrically controlled valve.

5. In a safety brake apparatus, the combination with a control pipe, means operated upon a reduction in fluid pressure in said pipe for effecting an emergency application of the brakes, a handle, and means operated upon release of said handle for venting fluid from said pipe, of a vent valve for venting fluid from said pipe, a handle, and means operated by said handle for effecting a service application, said handle having an emergency position in which said vent valve is operated.

6. In a safety brake apparatus, the combination with a control pipe, means operated upon a reduction in fluid pressure in said pipe for effecting an emergency application of the brakes, a handle, and means operated upon release of said handle for venting fluid from said pipe, of a vent valve for venting fluid from said pipe, a handle, and electrically controlled means operated upon movement of said handle to service position for effecting a service application of the brakes, said handle having an emergency position, in which said vent valve is operated to vent fluid from said control pipe.

7. In a safety brake apparatus, the combination with a control pipe, means operated upon a reduction in fluid pressure in said pipe for effecting an emergency application of the brakes, of a controller handle, means operated upon release of the controller handle for venting fluid from said pipe, an electrically controlled valve for controlling communication through said control pipe to said control pipe venting means, a foot operated switch for controlling the circuit of said electrically controlled means, and a hand operated brake controlling switch device for also controlling the circuit of said electrically controlled means.

8. In a safety brake apparatus, the combination with a control pipe and a valve device operated upon a reduction in fluid pressure in said pipe for effecting an emergency application of the brakes, of electrically controlled means for supplying fluid under pressure to said valve device, a handle, and means operated upon release of said handle for controlling the circuit of said electrically controlled means.

9. In a safety brake apparatus, the combination with a control pipe and a valve device operated upon a reduction in fluid pressure in said pipe for effecting an emergency application of the brakes, of electrically controlled means for supplying fluid under pressure to said valve device, a handle, and a switch operated when said handle is depressed for closing the circuit of said electrically controlled means.

10. In a safety brake apparatus, the combination with a control pipe and a valve device operated upon a reduction in fluid pressure in said pipe for effecting an emergency application of the brakes, of electrically controlled means for supplying fluid under pressure to said valve device, a handle, and a switch operated upon release of said handle for opening the circuit of said electrically controlled means.

11. In a safety brake apparatus, the combination with a control pipe and a valve device operated upon a reduction in fluid pressure in said pipe for effecting an emergency application of the brakes, of a magnet, and a valve operated upon energization of said magnet for supplying fluid under pressure to said valve device.

12. In a safety brake apparatus, the combination with a control pipe and a valve device operated upon a reduction in fluid pressure in said pipe for effecting an emergency application of the brakes, of a magnet, a valve operated upon energization of said magnet for supplying fluid under pressure to said valve device, a handle, and means operated upon release of said handle for effecting a reduction in fluid pressure in said pipe and for effecting the deenergization of said magnet to thereby operate said valve to cut off the supply of fluid to said valve device.

13. In a safety control apparatus, the combination with a handle and means controlled by the movement of said handle for effecting an application of the brakes, said handle being removable from its operating position, of electrically controlled means operated upon removal of said handle from its operating position for effecting an application of the brakes.

14. In a safety control apparatus, the combination with a removable handle and means controlled by said handle for effecting an application of the brakes, of a control pipe, means operated upon a reduction in fluid pressure in said pipe for effecting an emergency application of the brakes, and a valve for controlling communication through said pipe and operated upon removal of said handle for closing said communication.

15. In a safety control apparatus, the combination with a removable handle and means controlled by said handle for effecting an application of the brakes, of a control pipe, means operated upon a reduction in fluid pressure in said pipe for effecting an emergency application of the brakes, a valve for controlling communication through said pipe and operated upon removal of said handle for closing said communication, and means operated upon removal of said handle for effecting a service application of the brakes.

16. In a safety control apparatus, the combination with a removable handle and means controlled by said handle for effecting an application of the brakes, of a control pipe, means operated upon a reduction in fluid pressure in said pipe for effecting an emergency application of the brakes, a valve for controlling communication through said pipe and operated upon removal of said handle for closing said communication, and electrically controlled means operated upon removal of said handle for effecting a service application of the brakes.

17. In a safety control apparatus, the combination with a control pipe and a valve device operated upon a reduction in fluid pressure in said control pipe for effecting an application of the brakes, of a normally energized electrically controlled means for supplying fluid under pressure to said valve device and means operated upon movement of said valve device to effect an application of the brakes for deenergizing said electrically controlled means to thereby cut off the flow of fluid under pressure to said valve device.

18. In a safety control apparatus, the combination with a control pipe and a valve device operated upon a reduction in fluid pressure in said control pipe for effecting an application of the brakes, of a magnet, a valve operated upon energization of said magnet for supplying fluid under pressure to said valve device, a handle, a switch operated upon release of said handle for opening the circuit of said magnet, and a switch controlling a circuit including said magnet and means operated upon movement of said valve device to effect an application of the brakes, for opening said second switch.

19. In a safety control apparatus, the combination with a control pipe, a valve device operated upon a reduction in fluid pressure in said pipe for effecting an application of the brakes, and means operated upon movement of said valve device to effect an application of the brakes for opening the power circuit, of a handle, a valve for venting fluid from said pipe, and a switch controlling the power circuit, the release of said handle being adapted to open said valve and operate said switch.

20. In a safety control apparatus, the combination with controlling means at each end of the car for controlling the brakes and a removable handle for controlling said means, of electrically controlled means for effecting an application of the brakes, and a switch associated with the controlling means at each end of the car, said switches being operated upon removal of the handle at both ends of the car for completing a circuit to said electrically controlled means, to thereby effect an application of the brakes.

21. In a safety control apparatus, the combination with means for controlling the brakes and a removable handle for operating said means, of electrically controlled means for effecting the sanding of the rails, and a switch operated upon removal of said handle for cutting off the supply of current to said electrically controlled means.

22. In a safety brake apparatus, the combination with a control pipe, a reservoir normally charged with fluid under pressure, a valve device subject to the opposing pressures of the control pipe and said reservoir and operated upon a reduction in pressure in the control pipe for effecting an application of the brakes, of electrically controlled means operable to supply fluid from said reservoir to said control pipe.

In testimony whereof we have hereunto set our hands.

CLYDE C. FARMER.
JOSEPH C. McCUNE.